US009813371B2

United States Patent
She

(10) Patent No.: US 9,813,371 B2
(45) Date of Patent: Nov. 7, 2017

(54) METHOD, SENDING TERMINAL, RECEIVING TERMINAL, AND SYSTEM FOR CLASSIFYING EMAILS

(71) Applicant: Alibaba Group Holding Limited, George Town (KY)

(72) Inventor: Zhiyong She, Hangzhou (CN)

(73) Assignee: Alibaba Group Holding Limited (KY)

( * ) Notice: Subject to any disclaimer, the term of this patent is extended or adjusted under 35 U.S.C. 154(b) by 143 days.

(21) Appl. No.: 14/558,594

(22) Filed: Dec. 2, 2014

(65) Prior Publication Data
US 2015/0172233 A1    Jun. 18, 2015

(30) Foreign Application Priority Data
Dec. 16, 2013    (CN) .......................... 2013 1 0690396

(51) Int. Cl.
*G06F 15/16*    (2006.01)
*H04L 12/58*    (2006.01)

(52) U.S. Cl.
CPC .................................. *H04L 51/22* (2013.01)

(58) Field of Classification Search
CPC ...................................................... H04L 51/22
USPC ................................................ 709/206, 203
See application file for complete search history.

(56) References Cited

U.S. PATENT DOCUMENTS

| | | | |
|---|---|---|---|
| 9,154,473 B1 * | 10/2015 | Coleman | ............. H04L 63/0823 |
| 2003/0149732 A1 | 8/2003 | Peled et al. | |
| 2005/0144245 A1 | 6/2005 | Lowe | |
| 2006/0085504 A1 | 4/2006 | Yang et al. | |
| 2008/0052398 A1 | 2/2008 | Elshishiny | |
| 2008/0289037 A1 * | 11/2008 | Marman | ............... H04L 12/585 |
| | | | 726/22 |
| 2009/0327430 A1 | 12/2009 | Colvin et al. | |
| 2011/0173142 A1 | 7/2011 | Dasgupta et al. | |
| 2013/0097260 A1 * | 4/2013 | Lee | ......................... H04W 4/00 |
| | | | 709/206 |
| 2013/0179516 A1 | 7/2013 | Tsai et al. | |
| 2013/0297604 A1 | 11/2013 | Sutedja et al. | |
| 2014/0344250 A1 * | 11/2014 | Topatan | .............. G06F 17/3097 |
| | | | 707/722 |
| 2016/0165065 A1 * | 6/2016 | Damstra | ............. H04L 61/1594 |
| | | | 455/408 |

* cited by examiner

*Primary Examiner* — Bryan Lee
*Assistant Examiner* — Oluwatosin Gidado
(74) *Attorney, Agent, or Firm* — Van Pelt, Yi & James LLP

(57) ABSTRACT

Embodiments of the present application relate to a method for classifying emails, a sending terminal for classifying emails, a receiving terminal for classifying emails, and a computer program product for classifying emails. A method for classifying emails is provided. The method includes acquiring an email composed by a user, a classification tag corresponding to the email, and an identification code corresponding to the email, including the classification tag corresponding to the email and an identification code corresponding to the email in the email, and sending the email to receiving terminals.

13 Claims, 11 Drawing Sheets

100

METHOD, SENDING TERMINAL, RECEIVING TERMINAL, AND SYSTEM FOR CLASSIFYING EMAILS

CROSS REFERENCE TO OTHER APPLICATIONS

This application claims priority to People's Republic of China Patent Application No. 201310690396.2 entitled METHOD, SENDING TERMINAL, RECEIVING TERMINAL AND SYSTEM FOR CLASSIFYING EMAILS, filed Dec. 16, 2013 which is incorporated herein by reference for all purposes.

FIELD OF THE INVENTION

The present application relates to a method, a sending terminal, a receiving terminal, and a system for classifying emails.

BACKGROUND OF THE INVENTION

As communication technology develops, emailing has become a popular method for exchanging information. When too many emails exist, the emails are often classified to facilitate management and searching of the emails.

Existing methods for classifying emails typically include the following:

1) A filtering rule (such as a sender or title including preset keywords, etc.) is pre-established. The filtering rule manually or automatically classifies emails (moves emails to preset file folders, deletes emails, etc.)

2) Email addresses of a plurality of users of the same instant messaging group are organized into an email group. When an email is sent to the email group, the email is automatically broadcast to each user in the email group. After each user receives the email sent to the email group, the broadcast email is automatically classified and assigned to a file folder corresponding to the email group.

However, in some application scenarios (e.g., people typically participate in a corporate project for which a method for classifying emails is being implemented; a user who is participating in a project may receive emails with various subject lines from many different users, yet all these emails include information relating to the project), the first and second methods for classifying emails have limitations. If the first method for classifying emails is used to classify emails, establishing a complete filtering rule may be very difficult because the senders and subject lines are not fixed. If the second method for classifying emails is used to classify emails, classifying the emails by organizing an email group including the email addresses of all users in the project is not always possible because some emails with project information are not necessarily intended for all users in the project.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
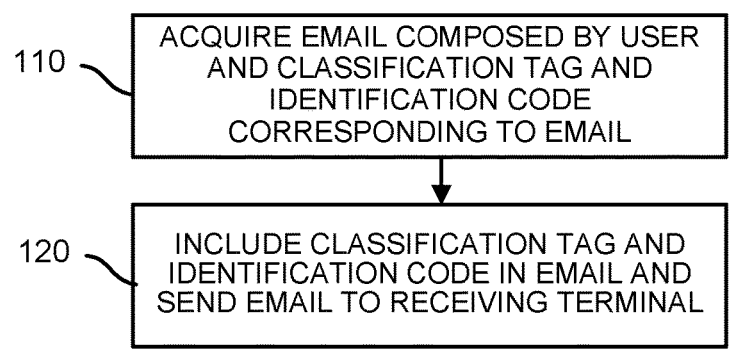
FIG. 1A is a flowchart illustrating an embodiment of a process for classifying emails.

FIG. 1A is a flowchart illustrating an embodiment of a process for classifying emails. In some embodiments, the process 100 is implemented by a sending terminal 620 of FIG. 6 and comprises:

In 110, the sending terminal acquires an email composed by a user and a classification tag and identification code corresponding to the email.

In 120, the sending terminal includes the classification tag and identification code corresponding to the email in the email, and sends the email to a receiving terminal and causes the receiving terminal to classify the email based on the classification tag and identification code corresponding to the email.

Figure 1B:
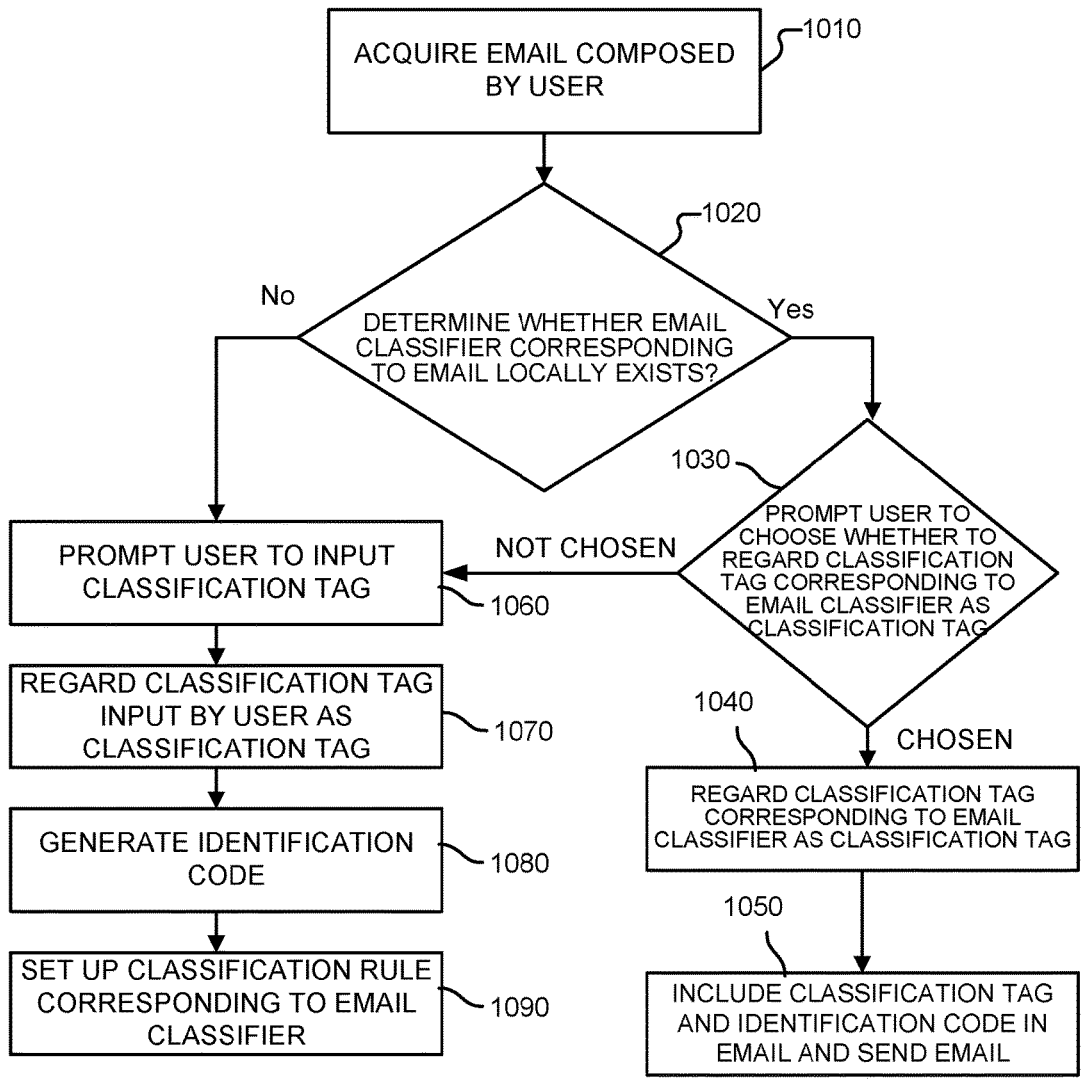
FIG. 1B is a flowchart illustrating an embodiment of a process for acquiring emails.

FIG. 1B is a flowchart illustrating an embodiment of a process for acquiring emails. In some embodiments, the process 1000 is an implementation of 110 of FIG. 1A and comprises:

In 1010, the sending terminal acquires an email composed by a user.

In 1020, the sending terminal determines whether an email classifier corresponding to the email exists locally. Details of the email classifier are further described below. In some embodiments, attributes of the email classifier include a classification tag corresponding to the email classifier and an identification code corresponding to the email classifier.

In 1030, in the event that the email classifier corresponding to the email exists, the sending terminal prompts the user to choose whether to regard the classification tag corresponding to the email classifier as a classification tag corresponding to the email. For example, the user is prompted via a pop-up window or other user interface. There is no restriction on how the user is prompted. In some embodiments, in the event the email classifier does not exist, a new email classifier is established.

In 1040, in the event that the user chooses to regard the classification tag corresponding to the email classifier as a classification tag corresponding to the email, the sending terminal regards the classification tag corresponding to the email classifier as a classification tag corresponding to the email and regards the identification code corresponding to the email classifier as an identification code corresponding to the email.

In 1050, the sending terminal, correspondingly, includes the classification tag and identification code corresponding to the email in the email, and sends the email to receiving terminals. In some embodiments, the classification tag and identification code corresponding to the email cause the receiving terminals to classify the email based on the classification tag and identification code corresponding to the email.

In some embodiments, the sending terminal includes the classification tag and identification code corresponding to the email in the email, sends the email to receiving terminals and causes the receiving terminals to classify the email based on the classification tag and identification code corresponding to the email and a classification rule corresponding to the email classifier. For example, the classification rule includes a classification based on the classification tag and the identification code.

In some embodiments, the attributes of the email classifier include a creator of the email classifier, a creation date of the email classifier, or a combination thereof. For example, A established rule B on Oct. 22, 2012.

In some embodiments, the sending terminal includes the classification tag and identification code corresponding to the email and the creator and creation date of the email classifier in the email, and sends the email to receiving terminals.

In some embodiments, the process 1000 further comprises:

In 1060, in the event that the email classifier corresponding to the email does not exist, or in the event that the user has not chosen to regard the classification tag corresponding to the email classifier as a classification tag corresponding to the email, the sending terminal prompts the user to input a classification tag.

In 1070, the sending terminal regards the classification tag input by the user as a classification tag corresponding to the email, and locally creates an email classifier corresponding to the email. In some embodiments, the classification tag corresponding to the created email classifier is the classification tag input by the user.

In 1080, the sending terminal generates an identification code corresponding to the email based on the classification tag input by the user and the creator and creation date for the created email classifier. In some embodiments, the identification code corresponding to the created email classifier is the generated identification code corresponding to the email.

In 1090, the sending terminal sets up a classification rule corresponding to the created email classifier.

Figure 1C:
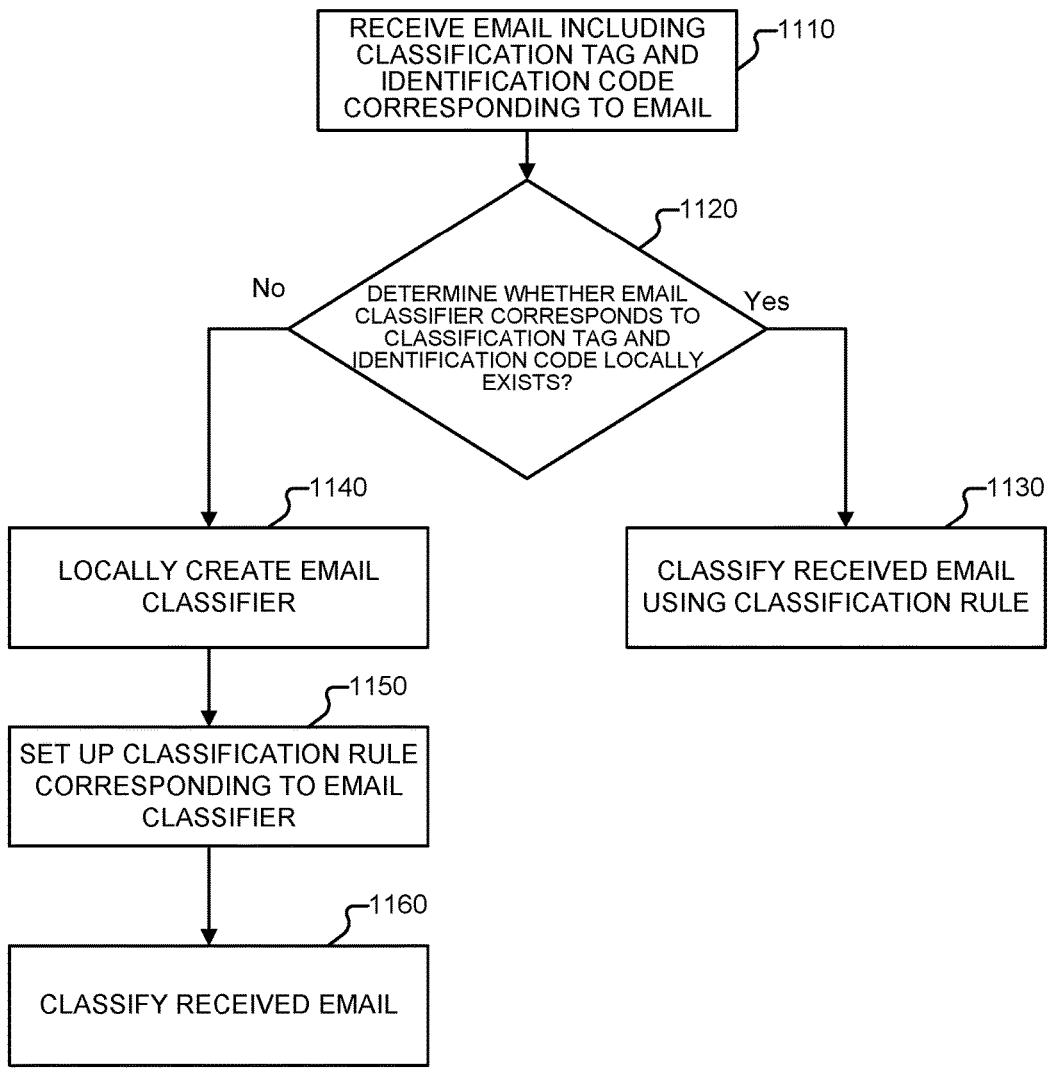
FIG. 1C is a flowchart illustrating another embodiment of a process for classifying emails.

FIG. 1C is a flowchart illustrating another embodiment of a process for classifying emails. In some embodiments, the process 1100 is implemented by a receiving terminal 610 of FIG. 6 and comprises:

In 1110, the receiving terminal receives an email including a classification tag and identification code corresponding to the email.

In 1120, the receiving terminal determines whether an email classifier corresponds to the classification tag and identification code corresponding to the email exists locally at the receiving terminal.

In 1130, in the event that the email classifier corresponding to the classification tag and identification code corresponding to the email exists locally, the receiving terminal classifies the received email based on a classification rule corresponding to the email classifier.

In some embodiments, after the receiving terminal determines whether the receiving terminal has the stored email classifier that corresponds to the classification tag and identification code corresponding to the email, the process 1100 further comprises:

In 1140, in the event that an email classifier corresponding to the classification tag and identification code corresponding to the email does not exist, the receiving terminal locally creates an email classifier based on the classification tag and identification code included in the email.

In 1150, the receiving terminal sets up a classification rule corresponding to the email classifier created by the receiving terminal.

In 1160, the receiving terminal classifies the received email based on the classification rule set up on the receiving terminal.

The above process 100 of FIG. 1A is as follows: An email composed by a user and the classification tag and identification code corresponding to the email are acquired. The classification tag and identification code corresponding to the email are included in the email, and the email is sent to receiving terminals. The above process 1100 of FIG. 1C is as follows: As a result, the receiving terminals classify the email based on the classification tag and identification code corresponding to the email. Without having to set up a classification rule, classifying emails of the same category is possible. The process 100 of FIG. 1A can be applied to application scenarios similar to those involving the implementation of corporate projects. For example, an email classifier is introduced into an email system, and attributes of the email classifier include a classification tag corresponding to the email classifier and an identification code corresponding to the email classifier. As a result, emails can be automatically classified by the email classifier, and email classification can be implemented quickly and conveniently. Furthermore, after receiving an email including a classification tag and identification code corresponding to the email, an email classifier corresponding to the classification tag and identification code corresponding to the email can be created and a corresponding classification rule can be set up.

After the next email including the classification tag and identification code is received, the classification rule is to be implemented on a default basis. This process 100 can reduce classification costs. For example, assume that an email including a classification tag and identification code corresponding to the email has 50 recipients. All of the 50 recipients simultaneously receive the email, an email classifier corresponding to the classification tag and identification code corresponding to the email is created, and a corresponding classification rule is set up. Thus, when a user subsequently sends an email including such a classification tag and identification code, and when the 50 users receive the email, all of the 50 users will automatically classify the received email. Thus, classification costs are greatly reduced for all users. (If the process 100 is not employed, then all 50 users are to manually perform a classification action.) Moreover, when the 50 users then reply to the email, the reply emails can automatically include the classification tag and identification code corresponding to the email. All the users who receive the reply emails are to perform the corresponding classification rule.

Figure 2A:
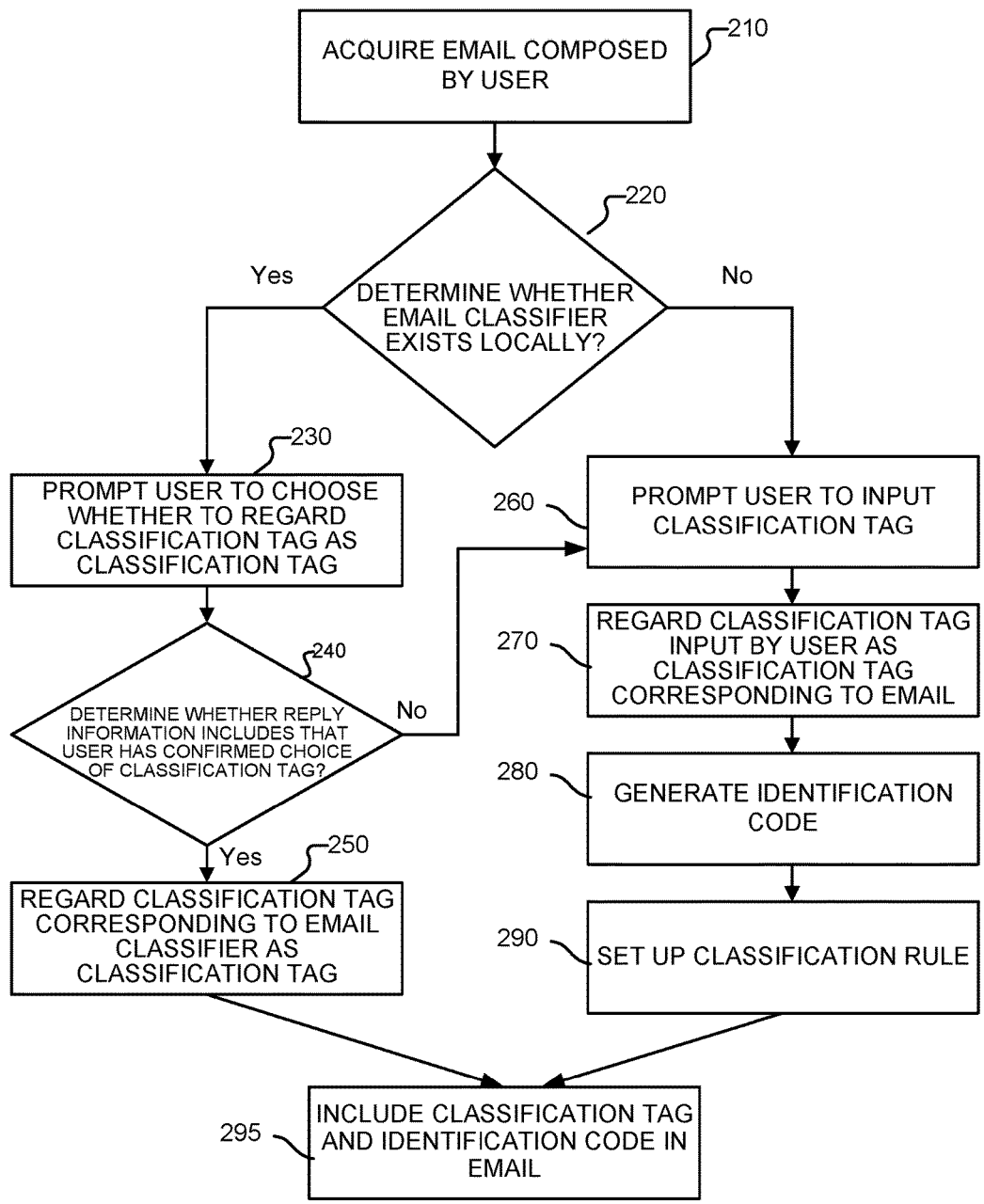
FIG. 2A is a flowchart illustrating yet another embodiment of a process for classifying emails.

FIG. 2A is a flowchart illustrating yet another embodiment of a process for classifying emails. In some embodiments, the process 200 is implemented by a sending terminal 620 of FIG. 6 and comprises:

In 210, the sending terminal acquires an email composed by a user.

In 220, the sending terminal determines whether an email classifier corresponding to the email exists locally. In some embodiments, the sending terminal makes email classification based on attributes of the email. In the event that the email classifier corresponding to the email exists locally, control passes to 230; otherwise, control passes to 260.

In some embodiments, attributes of the email classifier include a classification tag and identification code corresponding to the email classifier. In some embodiments, the attributes of the email classifier further include a creator and creation date of the email classifier. The identification code is used to differentiate different email classifiers. The identification code could be, for example, a Globally Unique Identifier. In some embodiments, the identification code corresponding to the email classifier is generated using the classification tag corresponding to the email classifier. In some embodiments, the identification code corresponding to the email classifier is generated using the classification tag corresponding to the email classifier and a creator and creation date of the email classifier.

In some embodiments, the classification tag is a project title. For example, in a project named the "Yahoo Transfer" project, Yahoo Transfer is selected for the classification tag. If, when determining whether the email classifier corresponding to the email exists locally (operation 220), an email classifier corresponding to the email exists, the previously created email classifier corresponding to the classification tag and identification code of the email is certified. Below, as an example to illustrate an email classifier based on the Yahoo Transfer classification tag, the attributes of an email classifier whose classification tag is Yahoo Transfer are as follows:

x-classify-tag-id:H4sIAAAAAAAA+NgFrrFKsWRWlGSWpSXmKPExsWS573otq7@aliyun.com
x-classify-tag-description: Yahoo Transfer
x-classify-tag-creator:shezhiyong@aliyun.com
x-classify-tag-create-date:2013-9-25

In some embodiments, after a user finishes writing an email, the classification tag corresponding to the email classifier is used to match text and subject line of the email to a character string of keywords associated with the classification tag. If the classification tag is "Yahoo Transfer," then the text and subject line of the email are matched with the character string of two keywords "Yahoo" and "Transfer." After the keywords associated with the classification tag have been matched, the user is prompted to choose the classification tag corresponding to the email classifier as a classification tag corresponding to the email. In other words, the user is prompted to choose the classification rule corresponding to the email classifier to classify the email.

In addition, the email classifier corresponds to the classification rule.

For example, the classification rule includes moving the email including the classification tag and identification code corresponding to the email to a file folder having a directory name corresponding to the classification tag (e.g., in the file folder having the directory name corresponding to "Yahoo Transfer"). In another example, the classification rule includes forwarding the email including the classification tag and identification code corresponding to the email to a preset email address, etc.

In 230, the sending terminal prompts the user to choose whether to regard the classification tag corresponding to the email classifier as a classification tag corresponding to the email.

In 240, the sending terminal determines whether reply information that is received includes that the user has confirmed the choice of the classification tag corresponding to the email classifier as a classification tag corresponding to the email. In the event that the reply information that is received includes that the user has confirmed the choice of the classification tag corresponding to the email classifier as the classification tag corresponding to the email, control passes to operation 250; otherwise, control passes to operation 260.

In 250, in the event that the reply information that is received includes that the user has confirmed the choice of the classification tag corresponding to the email classifier as the classification tag corresponding to the email, the sending terminal regards the classification tag corresponding to the email classifier as the classification tag corresponding to the email, and regards the identification code corresponding to the email classifier as the identification code corresponding to the email. Subsequently, control passes to operation 295.

In 260, in the event that the email classifier corresponding to the email exists locally or in the event that the reply information that is received includes that the user has not confirmed the choice of the classification tag corresponding to the email classifier as the classification tag corresponding to the email, the sending terminal prompts the user to input a classification tag.

In 270, the sending terminal regards the classification tag input by the user as the classification tag corresponding to the email, and locally creates an email classifier corresponding to the email.

In some embodiments, the created email classifier corresponding to the email classifier is the classification tag input by the user.

In 280, the sending terminal generates the identification code corresponding to the email based on the classification tag input by the user and the creator and creation date of the created email classifier.

The identification code corresponding to the created email classifier is the generated identification code corresponding to the email.

In 290, the sending terminal sets up a classification rule corresponding to the created email classifier.

In 295, the sending terminal includes the classification tag and identification code corresponding to the email in the email, and sends the email to receiving terminals and causes the receiving terminals to classify the email based on the classification tag and identification code corresponding to the email and the classification rule corresponding to the email classifier corresponding to the classification tag and identification code corresponding to the email.

In some embodiments, the classification tag and identification code corresponding to the email are included in a header of the email, in addition to the sender, recipient, subject line, timestamps, and other information related to the email. Moreover, in some embodiments, the creator and creation date of the email classifier is also included in the email to facilitate identification by a user of the receiving terminal. An email application can be configured to include various pieces of information in the header.

Figure 2B:
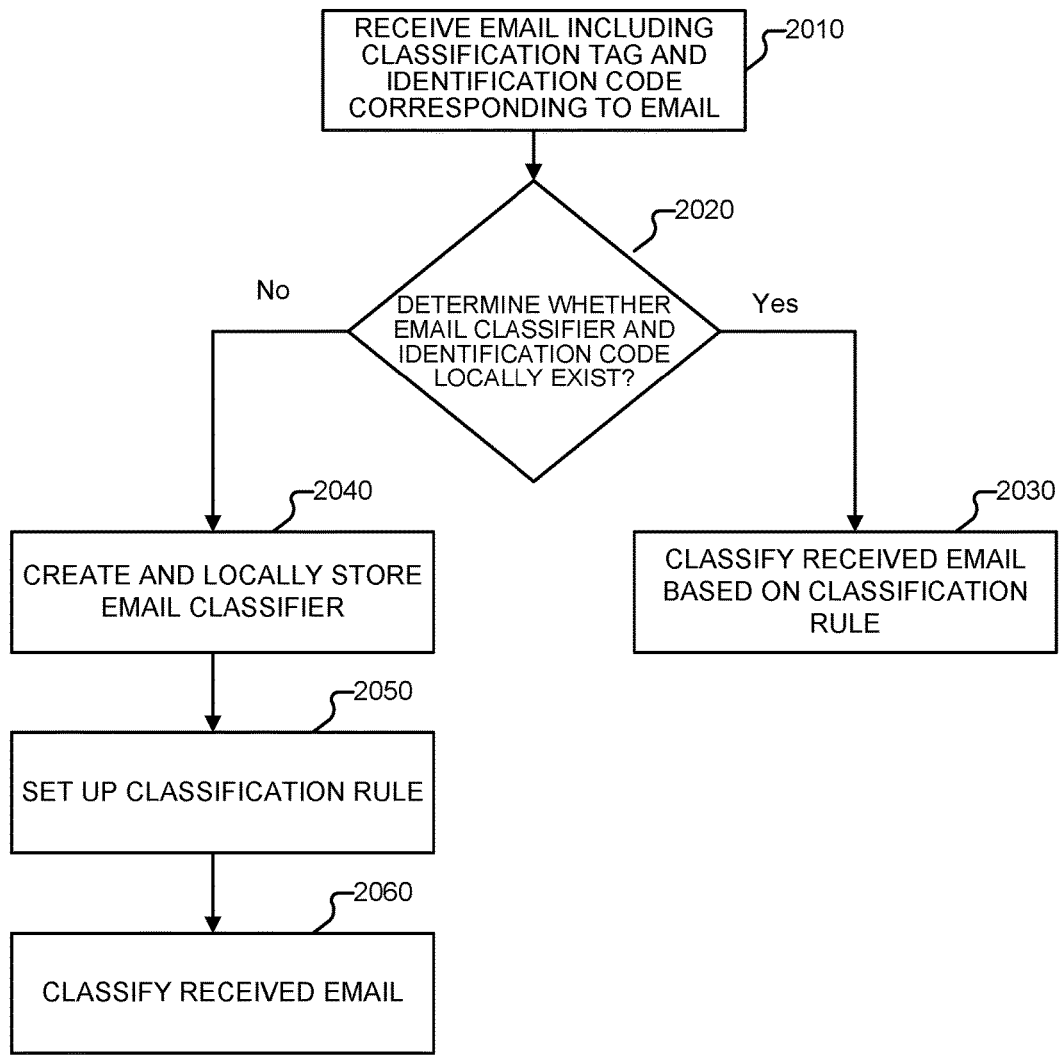
FIG. 2B is a flowchart illustrating yet another embodiment of a process for classifying emails.

FIG. 2B is a flowchart illustrating yet another embodiment of a process for classifying emails. In some embodiments, the process 2000 is implemented by a receiving terminal 610 of FIG. 6 and comprises:

In 2010, the receiving terminal receives an email including a classification tag and identification code corresponding to the email.

In 2020, the receiving terminal determines whether an email classifier corresponding to the classification tag and identification code corresponding to the email exist locally.

In 2030, in the event that the email classifier corresponding to the classification tag and identification code corresponding to the email exist locally, the receiving terminal classifies the received email based on a classification rule corresponding to the existing email classifier, and the process terminates.

In 2040, in the event that an email classifier corresponding to the classification tag and identification code corresponding to the email do not exist locally, the receiving terminal creates and locally stores an email classifier based on the classification tag and identification code included in the email.

In 2050, the receiving terminal sets up a classification rule corresponding to the email classifier created by the receiving terminal.

In 2060, the receiving terminal classifies the received email based on the setup classification rule.

The process 2000 of FIG. 2B is as follows: An email composed by a user and a classification tag and identification code corresponding to the email are acquired. The classification tag and identification code corresponding to the email are included in the email, and the email is sent to receiving terminals. As a result, the receiving terminals classify the email based on the classification tag and identification code corresponding to the email. Without having to set up a classification rule, classifying emails of the same category is possible. This process 2000 can be applied to application scenarios similar to those involving the implementation of corporate projects. For example, an email classifier is introduced into an email system, and attributes of the email classifier include a classification tag and identification code corresponding to the email classifier. As a result, emails can be automatically classified based on the email classifier, and email classification can be implemented quickly and conveniently. After receiving an email including a classification tag and identification code corresponding to the email, an email classifier corresponding to the classification tag and identification code corresponding to the email can be created and a corresponding classification rule can be set up. After the next email including the classification tag and identification code is received, the classification rule is to be executed on a default basis. The process 2000 can reduce classification costs. For example, assume that an email including a classification tag and identification code corresponding to the email has 50 recipients. All of the 50 recipients simultaneously receive the email, create an email classifier corresponding to the classification tag and identification code corresponding to the email, and set up a corresponding classification rule. In some embodiments, all of the recipients are each locally creating an email classifier. Thus, when a user subsequently sends an email including the classification tag and identification code, and when these 50 users receive the email, all of the 50 users will automatically classify the email. Thus, the classification cost is greatly reduced for all users. (If the process 2000 is not implemented, then all 50 users are to manually perform a classification action.) Moreover, when the 50 users then reply to the email, the reply emails can automatically include the classification tag and identification code corresponding to the email. All the users who receive the reply emails are to perform the corresponding classification rule.

Figure 3A:
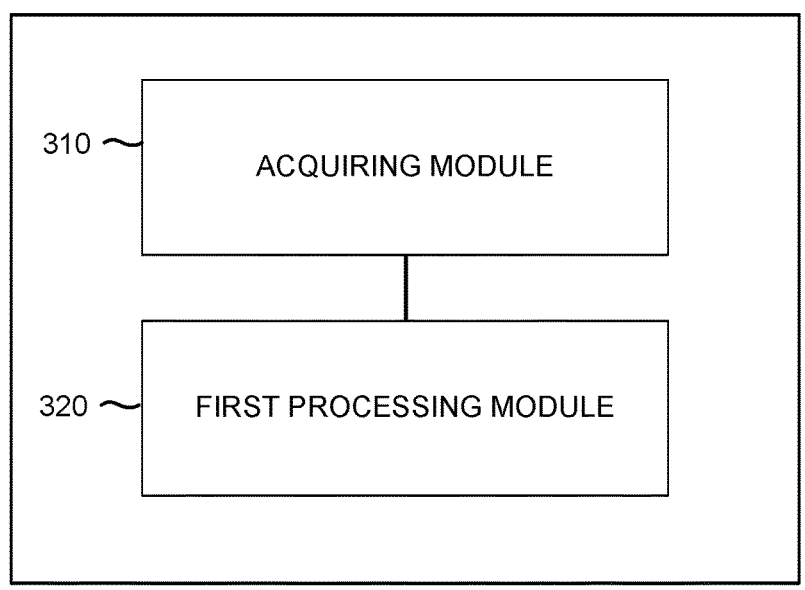
FIG. 3A is a structural diagram illustrating an embodiment of a device for classifying emails.

FIG. 3A is a structural diagram illustrating an embodiment of a device for classifying emails. In some embodiments, the device 300 implements the process 100 and comprises an acquiring module 310 and a first processing module 320.

In some embodiments, the acquiring module 310 acquires an email composed by a user and a classification tag and identification code corresponding to the email.

In some embodiments, the first processing module 320 includes the classification tag and identification code corresponding to the email in the email, and sends the email to receiving terminals and causes the receiving terminals to classify the email based on the classification tag and identification code corresponding to the email.

Figure 3B:
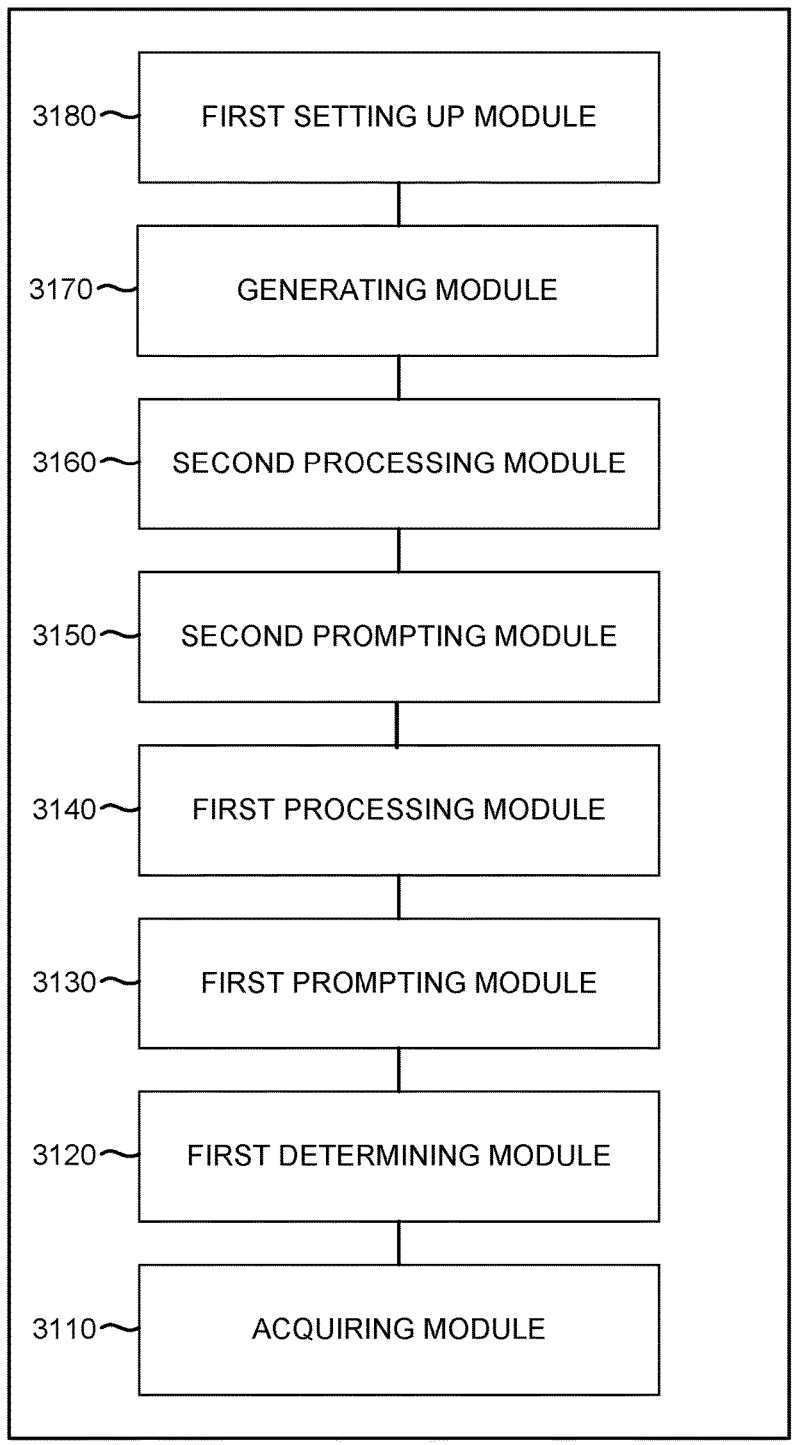
FIG. 3B is a structural diagram illustrating another embodiment of an acquiring module.

FIG. 3B is a structural diagram illustrating an embodiment of an acquiring module. In some embodiments, the acquiring module 3100 is an implementation of the acquiring module 310 of FIG. 3A and comprises an acquiring module 3110, a first determining module 3120, a first prompting module 3130, and a first processing module 3140.

In some embodiments, the acquiring module 3110 acquires an email composed by a user.

In some embodiments, the first determining module 3120 determines whether an email classifier corresponding to the email exists locally. In some embodiments, attributes of the email classifier include a classification tag and identification code corresponding to the email classifier.

In some embodiments, the first prompting module 3130, in the event that the determination result of the first determining module 3120 is that the email classifier corresponding to the email exists locally, prompts the user to choose whether to regard the classification tag corresponding to the email classifier as a classification tag corresponding to the email.

In some embodiments, the first processing module 3140, in the event that the user chooses to regard the classification tag corresponding to the email classifier as the classification tag corresponding to the email, regards the classification tag corresponding to the email classifier as a classification tag corresponding to the email and regards the identification code corresponding to the email classifier as an identification code corresponding to the email.

Referring back to FIG. 3A, the first processing module 320 includes a classification tag and identification code corresponding to the email in the email and sends the email to receiving terminals. In some embodiments, upon receiving the email, the receiving terminals classify the email based on the classification tag and identification code corresponding to the email and a classification rule corresponding to the email classifier.

In some embodiments, attributes of the email classifier further comprise a creator and a creation date of the email classifier.

In some embodiments, the first processing module 320 includes the classification tag and identification code corresponding to the email and the creator and creation date of the email classifier in the email and sends the email to the receiving terminals.

Referring back to FIG. 3B, in some embodiments, the acquiring module 3100 further comprises a second prompting module 3150, a second processing module 3160, a generating module 3170, and a first setting up module 3180.

In some embodiments, the second prompting module 3150, in the event that the email classifier corresponding to the email does not exist or in the event that the user has not chosen to regard the classification tag corresponding to the email classifier as a classification tag corresponding to the email, prompts the user to input a classification tag.

In some embodiments, the second processing module 3160 regards the classification tag input by the user as a classification tag corresponding to the email and locally creates an email classifier corresponding to the email. In some embodiments, the classification tag corresponding to the created email classifier is the classification tag input by the user.

In some embodiments, the generating module 3170 generates an identification code corresponding to the email based on the classification tag input by the user and the creator and creation date of the created email classifier. In some embodiments, the identification code corresponding to the created email classifier is the generated identification code corresponding to the email.

In some embodiments, the first setting up module 3180 sets up a classification rule corresponding to the created email classifier.

Figure 4:
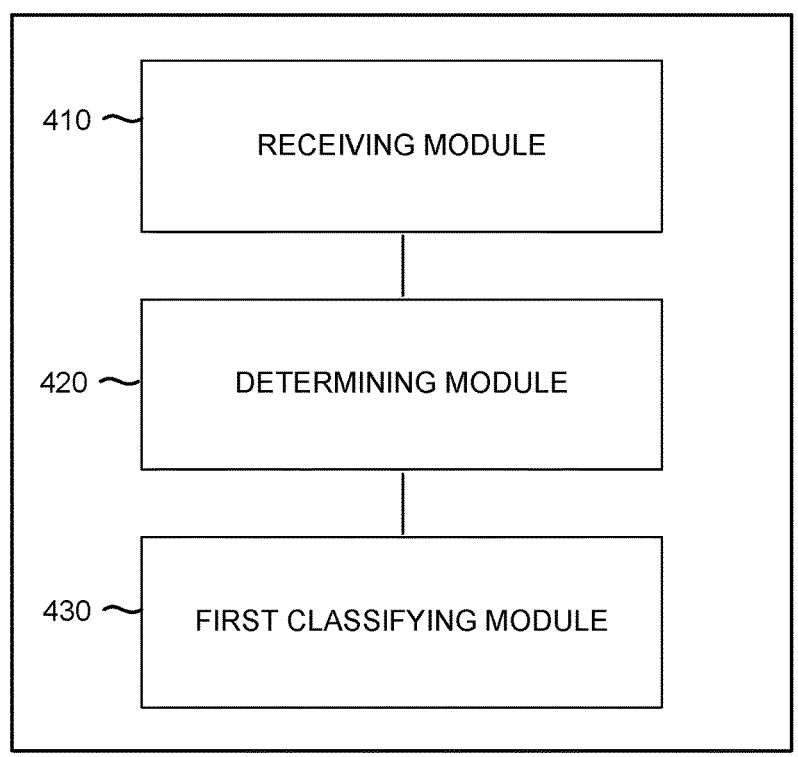
FIG. 4 is a structural diagram illustrating an embodiment of a receiving terminal for classifying emails.

FIG. 4 is a structural diagram illustrating an embodiment of a receiving terminal for classifying emails. In some embodiments, the receiving terminal 400 implements the process 1100 of FIG. 1C and comprises a receiving module 410, a determining module 420, and a first classifying module 430.

In some embodiments, the receiving module 410 receives an email including a classification tag and identification code corresponding to the email.

In some embodiments, the determining module 420 determines whether an email classifier corresponding to the classification tag and identification code corresponding to the email exist locally.

In some embodiments, the first classifying module 430, in the event that the determination result of the determining module 420 is that an email classifier corresponding to the classification tag and identification code corresponding to the email exist locally, classifies the received email based on a classification rule corresponding to the email classifier.

Figure 5:
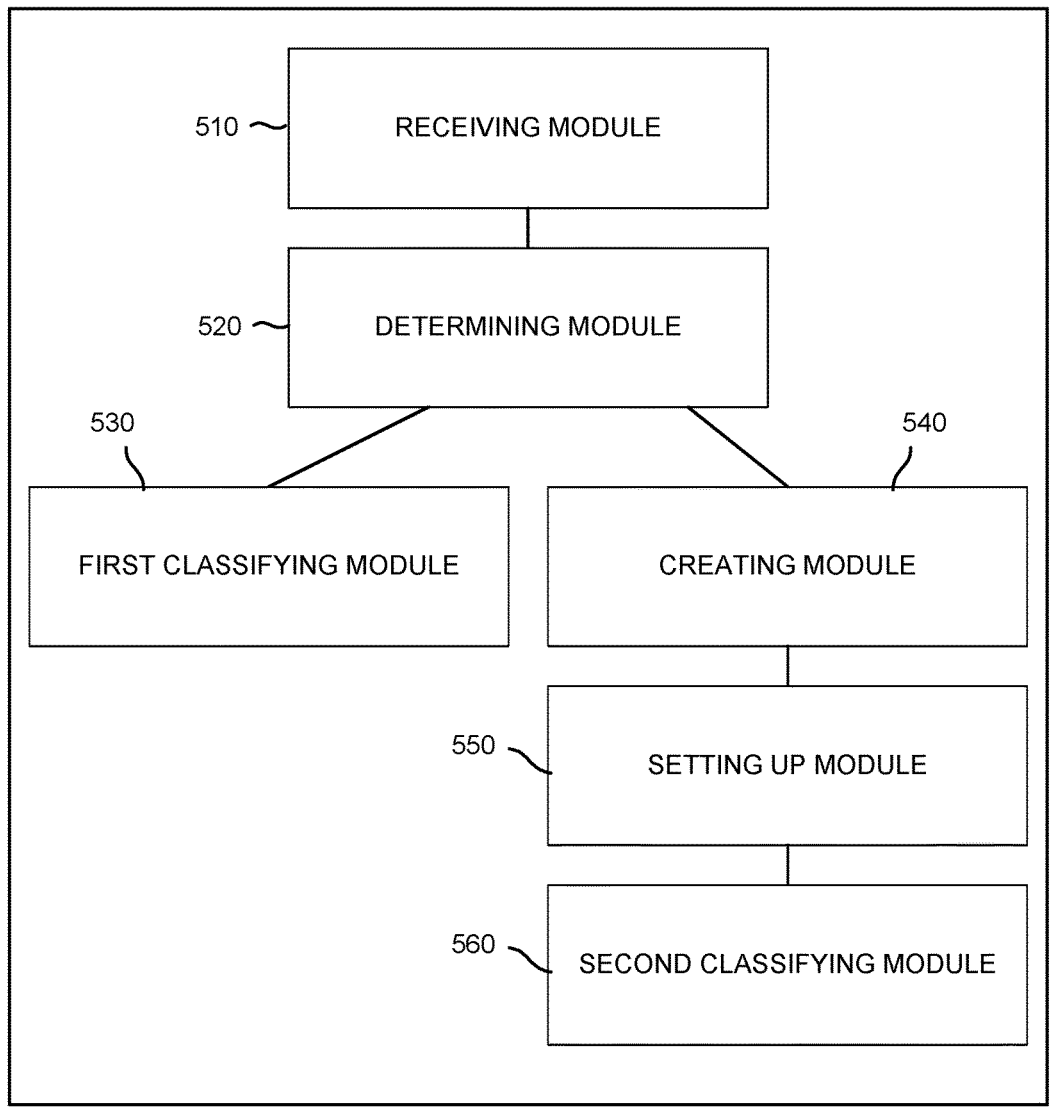
FIG. 5 is a structural diagram illustrating another embodiment of a receiving terminal for classifying emails.

FIG. 5 is a structural diagram illustrating another embodiment of a receiving terminal for classifying emails. In some embodiments, the receiving terminal 500 implements the process 2000 of FIG. 2B and comprises a receiving module 510, a determining module 520, and a first classifying module 530.

In some embodiments, the receiving module 510, the determining module 520, and the first classifying module 530 correspond with the receiving module 410, the determining module 420, and the first classifying module 430 of FIG. 4, respectively.

In some embodiments, the receiving terminal 500 further comprises a creating module 540, a setting up module 550, and a second classifying module 560.

In some embodiments, the creating module 540, in the event that the determination result of the determining module 520 is that an email classifier corresponding to the classification tag and identification code corresponding to the email do not exist, creates an email classifier based on the classification tag and identification code included in the email, and locally stores the email classifier.

In some embodiments, the setting up module 550 sets up a classification rule corresponding to the email classifier created by the creating module 540.

In some embodiments, the second classifying module 560 classifies the received email based on the classification rule set up by the setting up module 550.

Figure 6:
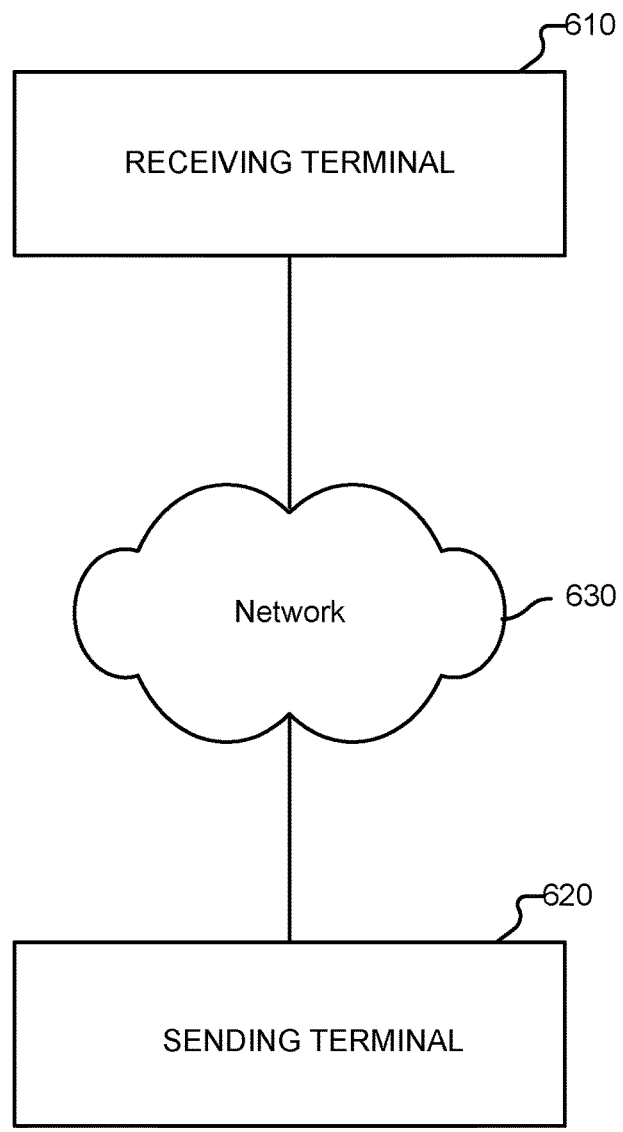
FIG. 6 is a structural diagram illustrating an embodiment of a system for classifying emails.

FIG. 6 is a structural diagram illustrating an embodiment of a system for classifying emails. In some embodiments, the system 600 includes a sending terminal 620 connected to a receiving terminal 610 via a network 630.

In some embodiments, the sending terminal 620 acquires an email and a classification tag and identification code corresponding to the email, and sends the email to the receiving terminal 610 to be classified based on the classification tag and identification code included in the email.

Figure 7:
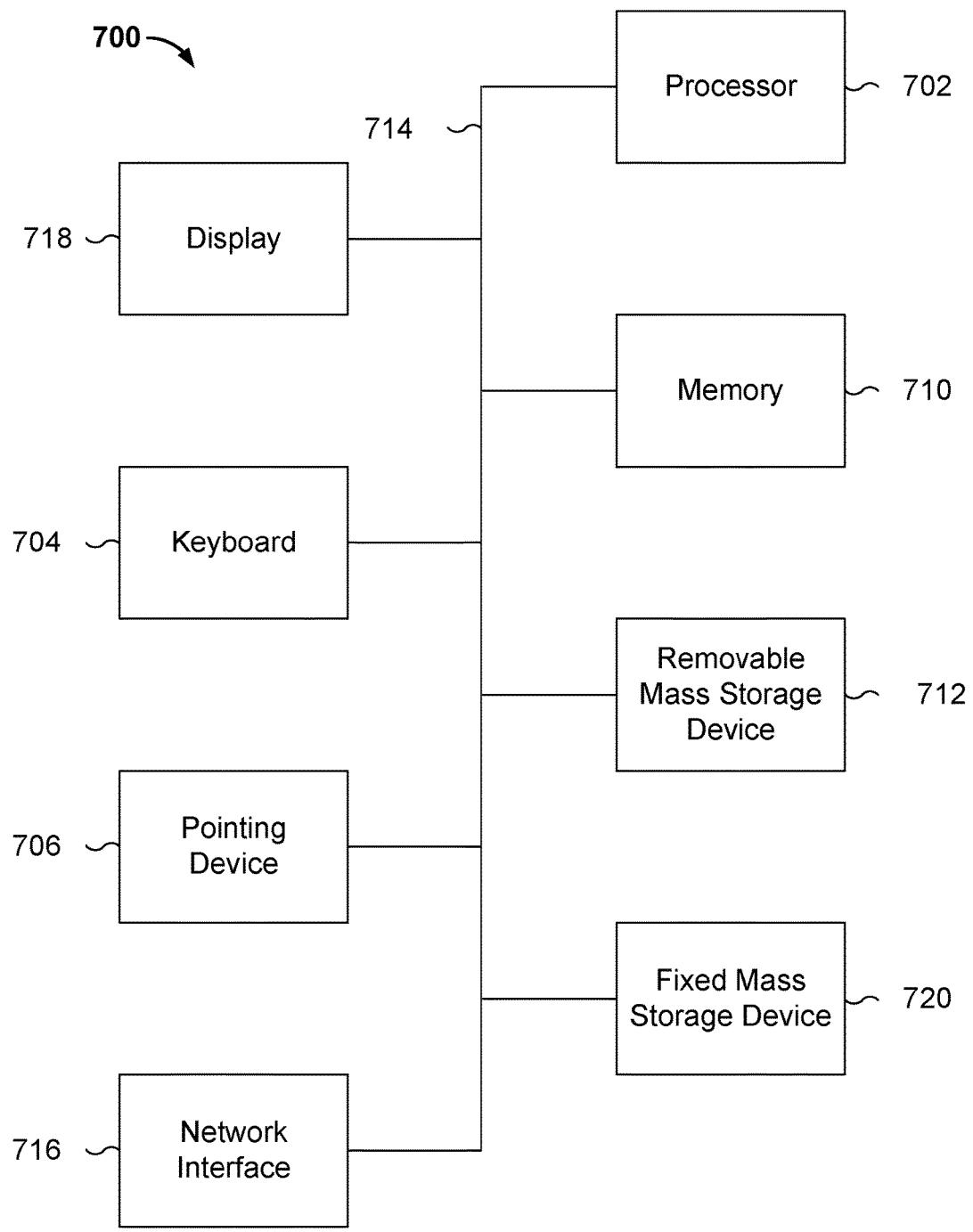
FIG. 7 is a structural diagram illustrating an embodiment of a computer system for classifying emails.

FIG. 7 is a structural diagram illustrating an embodiment of a computer system for classifying emails. As will be apparent, other computer system architectures and configurations can be used to classify emails. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage 712, 720 generally store additional programming instructions, data, and the like that typically are not in active use by the processor 702. It will be appreciated that the information retained within mass storage 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for classifying emails, comprising:
acquiring an email composed by a user, a classification tag corresponding to the email, and an identification code corresponding to the email, comprising:
determining whether an email classifier corresponding to the email exists;
in response to a determination that the email classifier corresponding to the email does not exist:
locally creating the email classifier corresponding to the email; and
generating the identification code corresponding to the email based on a classification tag input by the user and a creator and creation date for the created email classifier;
including the classification tag corresponding to the email and the identification code corresponding to the email in the email; and
sending the email to receiving terminals and causing the receiving terminals to classify the received email based on the classification tag and the identification code corresponding to the email, wherein a receiving terminal is configured to:
determine whether a locally stored email classifier corresponding to the classification tag and the identification code corresponding to the email exists; and
in response to a determination that the locally stored email classifier corresponding to the classification tag and the identification code corresponding to the email does not exist:
locally create an email classifier based on the received classification tag and the received identification code;
set up a classification rule based on the created email classifier; and
classify the received email based on the set up classification rule.

2. The method as described in claim 1, wherein the acquiring of the email composed by the user, the classification tag corresponding to the email, and the identification code corresponding to the email comprises:
in response to a determination that the email classifier corresponding to the email exists locally, prompting the user to choose whether to regard the classification tag corresponding to the email classifier as the classification tag corresponding to the email; and in response to a determination that the user chooses to regard the classification tag corresponding to the email classifier as the classification tag corresponding to the email, regarding the classification tag corresponding to the email classifier as the classification tag corresponding to the email and the identification code corresponding to the email classifier as the identification code corresponding to the email.

3. The method as described in claim 2, wherein:
the creator and the creation date of the email classifier are further included in the email.

4. The method as described in claim 2, further comprises:
in response to a determination that the email classifier corresponding to the email does not exist:
  setting up a classification rule corresponding to the created email classifier.

5. A method for classifying emails, comprising:
receiving an email including a classification tag corresponding to the email and an identification code corresponding to the email;
determining whether a locally stored email classifier corresponding to the classification tag and the identification code corresponding to the email exists; and
in response to a determination that the locally stored email classifier corresponding to the classification tag and the identification code corresponding to the email exists, classifying the received email based on a classification rule corresponding to the email classifier, wherein an attribute of the email classifier includes a creator of the email classifier, a creation date of the email classifier, or both, wherein the email, via the attribute of the email classifier, is classified based on the classification rule; and
in response to a determination that the locally stored email classifier corresponding to the classification tag and the identification code corresponding to the email does not exist:
  locally creating an email classifier based on the received classification tag and the received identification code;
  setting up a classification rule based on the created email classifier; and
  classifying the received email based on the set up classification rule.

6. A sending terminal for classifying emails, comprising:
a processor; and
a memory coupled with the processor, wherein the memory is configured to provide the processor with instructions which when executed cause the processor to:
  acquire an email composed by a user, a classification tag corresponding to the email, and an identification code corresponding to the email, comprising to:
    determine whether an email classifier corresponding to the email exists;
    in response to a determination that the email classifier corresponding to the email does not exist:
      locally create the email classifier corresponding to the email; and
      generate the identification code corresponding to the email based on a classification tag input by the user and a creator and creation date for the created email classifier; and
    include the classification tag corresponding to the email and the identification code corresponding to the email in the email and send the email to receiving terminals and cause the receiving terminals to classify the received email based on the classification tag and the identification code corresponding to the email, wherein a receiving terminal is configured to:
      determine whether a locally stored email classifier corresponding to the classification tag and the identification code corresponding to the email exists; and
      in response to a determination that the locally stored email classifier corresponding to the classification tag and the identification code corresponding to the email does not exist:
        locally create an email classifier based on the received classification tag and the received identification code;
        set up a classification rule based on the created email classifier; and
        classify the received email based on the set up classification rule.

7. The sending terminal as described in claim 6, wherein the acquiring of the email composed by the user, the classification tag corresponding to the email, and the identification code corresponding to the email comprises to:
  in response to a determination that the email classifier corresponding to the email exists locally, prompt the user to choose whether to regard the classification tag corresponding to the email classifier as the classification tag corresponding to the email; and
  in response to a determination that the user chooses to regard the classification tag corresponding to the email classifier as the classification tag corresponding to the email, regard the classification tag corresponding to the email classifier as the classification tag corresponding to the email and the identification code corresponding to the email classifier as the identification code corresponding to the email.

8. The sending terminal as described in claim 7, wherein the determining of whether the email classifier corresponding to the email exists locally is further configured to:
  include the classification tag and the identification code corresponding to the email in the email; and
  send the email to the receiving terminals and cause the receiving terminals to classify the email based on the classification tag and the identification code corresponding to the email and a classification rule corresponding to the email classifier.

9. The sending terminal as described in claim 7, wherein:
the attributes of the email classifier further comprise a creator identifier and a creation date of the email classifier;
the creator identifier and the creation date of the email classifier are further included in the email; and
the regarding of the classification tag corresponding to the email classifier as the classification tag corresponding to the email and the identification code corresponding to the email classifier as the identification code corresponding to the email further comprises to:
  send the email to the receiving terminals.

10. The sending terminal as described in claim 7, wherein the acquiring of the email composed by the user, the classification tag corresponding to the email, and the identification code corresponding to the email comprises to:
  in response to a determination that the email classifier corresponding to the email does not exist:
    set up a classification rule corresponding to the created email classifier.

11. A receiving terminal for classifying emails, comprising:
- a processor; and
- a memory coupled with the processor, wherein the memory is configured to provide the processor with instructions which when executed cause the processor to:
  - receive an email including a classification tag corresponding to the email and an identification code corresponding to the email;
  - determine whether a locally stored email classifier corresponding to the classification tag and the identification code corresponding to the email exists; and
  - in response to a determination that the locally stored email classifier corresponding to the classification tag and the identification code corresponding to the email exists, classify the received email based on a classification rule corresponding to the email classifier, wherein an attribute of the email classifier includes a creator of the email classifier, a creation date of the email classifier, or both, wherein the email, via the attribute of the email classifier, is classified based on the classification rule; and
  - in response to a determination that the locally stored email classifier corresponding to the classification tag and the identification code corresponding to the email does not exist:
    - locally create an email classifier based on the received classification tag and the received identification code;
    - set up a classification rule based on the created email classifier; and
    - classify the received email based on the set up classification rule.

12. A computer program product for classifying emails, the computer program product being embodied in a tangible non-transitory computer readable storage medium and comprising computer instructions for:
- acquiring an email composed by a user, a classification tag corresponding to the email, and an identification code corresponding to the email, comprising:
  - determining whether an email classifier corresponding to the email exists;
  - in response to a determination that the email classifier corresponding to the email does not exist:
    - locally creating the email classifier corresponding to the email; and
    - generating the identification code corresponding to the email based on a classification tag input by the user and a creator and creation date for the created email classifier;
- including the classification tag corresponding to the email and the identification code corresponding to the email in the email; and
- sending the email to receiving terminals and causing the receiving terminals to classify the received email based on the classification tag and the identification code corresponding to the email, wherein a receiving terminal is configured to:
  - determine whether a locally stored email classifier corresponding to the classification tag and the identification code corresponding to the email exists; and
  - in response to a determination that the locally stored email classifier corresponding to the classification tag and the identification code corresponding to the email does not exist:
    - locally create an email classifier based on the received classification tag and the received identification code;
    - set up a classification rule based on the created email classifier; and
    - classify the received email based on the set up classification rule.

13. A computer program product for classifying emails, the computer program product being embodied in a tangible non-transitory computer readable storage medium and comprising computer instructions for:
- receiving an email including a classification tag corresponding to the email and an identification code corresponding to the email;
- determining whether a locally stored email classifier corresponding to the classification tag and the identification code corresponding to the email exists;
- in response to a determination that the locally stored email classifier corresponding to the classification tag and the identification code corresponding to the email exists, classifying the received email based on a classification rule corresponding to the email classifier, wherein an attribute of the email classifier includes a creator of the email classifier, a creation date of the email classifier, or both, wherein the email, via the attribute of the email classifier, is classified based on the classification rule; and
- in response to a determination that the locally stored email classifier corresponding to the classification tag and the identification code corresponding to the email does not exist:
  - locally creating an email classifier based on the received classification tag and the received identification code;
  - setting up a classification rule based on the created email classifier; and
  - classifying the received email based on the set up classification rule.

* * * * *